(12) United States Patent
Hashimoto et al.

(10) Patent No.: US 11,248,682 B2
(45) Date of Patent: Feb. 15, 2022

(54) TENSIONER LEVER

(71) Applicant: TSUBAKIMOTO CHAIN CO., Osaka (JP)

(72) Inventors: Hiroshi Hashimoto, Osaka (JP); Yuji Kurematsu, Osaka (JP); Kaori Mori, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 203 days.

(21) Appl. No.: 16/814,069

(22) Filed: Mar. 10, 2020

(65) Prior Publication Data
US 2020/0362944 A1 Nov. 19, 2020

(30) Foreign Application Priority Data

May 15, 2019 (JP) .............................. JP2019-092000

(51) Int. Cl.
*F16H 7/08* (2006.01)
*F16H 7/18* (2006.01)

(52) U.S. Cl.
CPC ................ *F16H 7/08* (2013.01); *F16H 7/18* (2013.01); *F16H 2007/0872* (2013.01); *F16H 2007/185* (2013.01)

(58) Field of Classification Search
CPC ... F16H 7/00; F16H 7/706; F16H 7/08; F16H 7/18; F16H 2007/185; F16H 2007/0863; F16H 2007/0872; F16H 2007/0893
USPC ................................................. 474/111, 140
See application file for complete search history.

(56) References Cited

U.S. PATENT DOCUMENTS

| 5,318,482 | A | * | 6/1994 | Sato ........................... F16H 7/08 474/111 |
| 6,036,613 | A | * | 3/2000 | Diehm ........................ F01L 1/02 474/111 |
| 6,086,498 | A | * | 7/2000 | Hashimoto ............... F16H 7/08 474/111 |
| 6,120,403 | A | * | 9/2000 | Suzuki ..................... F16C 11/04 474/111 |

(Continued)

FOREIGN PATENT DOCUMENTS

| DE | 102015209556 A1 | * | 12/2016 | .............. F16H 7/18 |
| EP | 0553474 A1 | * | 8/1993 | .............. B23P 13/04 |

(Continued)

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

The problem to be solved is to provide a tensioner lever that inhibits friction-induced wear or seizure on a surface of a pivoting support boss contacting a shoulder bolt so that high durability is achieved, and that is easily producible and enables cost reduction. As a solution to the problem noted above, the tensioner lever includes a shoe having a traveling surface, a lever body, and a pivotal support boss provided at a proximal end of the lever body to allow a distal end thereof to swing. The shoe and the lever body are integrally formed and assembled together by double injection molding. The lever body includes a slide bearing member, and a connecting part that connects the slide bearing member and the shoe. The slide bearing member, the connecting part, and the shoe are made of the same synthetic resin, and configured as a continuous one-piece component.

6 Claims, 4 Drawing Sheets

(56) References Cited

U.S. PATENT DOCUMENTS

| | | | |
|---|---|---|---|
| 6,428,435 B1* | 8/2002 | Kumakura | F16H 7/08 |
| | | | 474/111 |
| 6,612,952 B1* | 9/2003 | Simpson | F16H 7/08 |
| | | | 474/111 |
| 8,747,263 B2* | 6/2014 | Konno | F16H 7/18 |
| | | | 474/111 |
| 10,408,311 B2* | 9/2019 | Doveri | F16H 7/08 |
| 2002/0050184 A1* | 5/2002 | Suzuki | G05G 1/10 |
| | | | 74/523 |
| 2004/0058761 A1* | 3/2004 | Konno | F16H 7/18 |
| | | | 474/111 |
| 2006/0054121 A1* | 3/2006 | Koch | F01L 1/02 |
| | | | 123/90.17 |
| 2008/0242460 A1* | 10/2008 | Hewitt | F16H 7/18 |
| | | | 474/111 |
| 2009/0036241 A1 | 2/2009 | Hirayama et al. | |
| 2009/0197724 A1* | 8/2009 | Young | F16B 39/32 |
| | | | 474/133 |
| 2010/0210384 A1* | 8/2010 | Young | F16H 7/08 |
| | | | 474/111 |
| 2010/0292037 A1* | 11/2010 | Botez | F16H 7/18 |
| | | | 474/111 |
| 2012/0035010 A1* | 2/2012 | Young | F16H 7/08 |
| | | | 474/111 |
| 2012/0129636 A1* | 5/2012 | Lee | F16H 7/18 |
| | | | 474/111 |
| 2013/0210566 A1 | 8/2013 | Konno | |
| 2014/0057749 A1* | 2/2014 | Konno | F16H 7/08 |
| | | | 474/111 |
| 2015/0024889 A1* | 1/2015 | Konno | F16H 7/18 |
| | | | 474/111 |
| 2015/0204218 A1* | 7/2015 | Utaki | F01L 1/46 |
| | | | 474/140 |
| 2015/0204437 A1* | 7/2015 | Utaki | F16H 7/18 |
| | | | 474/91 |
| 2015/0219190 A1* | 8/2015 | Geibel | F16H 7/18 |
| | | | 474/111 |
| 2016/0069432 A1* | 3/2016 | Wach | F16H 7/08 |
| | | | 474/111 |
| 2018/0094708 A1* | 4/2018 | Ikeda | F16H 7/06 |
| 2018/0252301 A1* | 9/2018 | Konno | F16H 7/18 |
| 2021/0285537 A1* | 9/2021 | Shimosaka | F16H 57/05 |

FOREIGN PATENT DOCUMENTS

| | | | | |
|---|---|---|---|---|
| EP | 1267097 B1 | * | 3/2004 | F16H 7/18 |
| EP | 1400725 A2 | * | 3/2004 | F16H 7/0848 |
| JP | 2001349400 A | * | 12/2001 | |
| JP | 2009-36273 A | | 2/2009 | |
| JP | 2013-164134 A | | 8/2013 | |
| JP | 2014070672 A | * | 4/2014 | |

* cited by examiner

TENSIONER LEVER

BACKGROUND OF THE INVENTION

1. Field of the Invention

The present invention relates to a tensioner lever including a resin shoe having a traveling surface on which a drive chain slides during travel along a guide length direction, a lever body that supports the back side of the shoe along the guide length direction, and a pivotal support boss provided at a proximal end in the guide length direction of the lever body to allow a distal end thereof to swing, the shoe and the lever body being integrally formed and assembled together by double injection molding.

2. Description of the Related Art

In transmissions of car engines and the like are commonly used a timing system, wherein an endless drive chain such as a roller chain is passed over respective sprockets of a crank shaft and cam shafts inside the engine room and slidably guided by a guide shoe.

In such an engine timing system, for example, as shown in FIG. 6, an endless drive chain C passes over a drive sprocket S1 mounted to a crankshaft and a pair of driven sprockets S2, S2 mounted to cam shafts inside the engine room E, and this drive chain C is slidably guided by a tensioner lever 500 that cooperates with a tensioner T, and a fixed chain guide G. The fixed chain guide G is secured to an inner wall of the engine room E.

Such a tensioner lever 500 commonly includes, as shown in FIG. 7, a shoe 510 (indicated with thick hatches in FIG. 7) on which the drive chain slides during travel along a guide length direction, a lever body 520 that supports the back side of the shoe 510 along the guide length direction, and a pivotal support boss 530 provided at a proximal end in the guide length direction of the lever body 520 to allow a distal end thereof to swing. The tensioner lever 500 is attached to an inner wall of the engine room E such as to be pivotable in a plane in which the drive chain C passes, with a shoulder bolt (not shown) passed through the pivotal support boss 530 along the pivot axis L (see, for example, Japanese Patent Application Laid-open No. 2009-36273 and Japanese Patent Application Laid-open No. 2013-164134).

The shoe 510 that forms part of the tensioner lever 500 is made of a resin having good low-friction properties (self-lubricating properties) such as nylon resin and the like. The tensioner lever 500 can be produced by molding, for example, whereby the shoe 510 is integrally formed with the lever body 520, which is made of a high-rigidity material.

SUMMARY OF THE INVENTION

Since the lever body of the tensioner lever including the pivotal support boss is made of a high-rigidity material such as nylon resin containing glass fiber reinforcement to secure strength, making the lever body swingable around the pivot axis by passing a shoulder bolt through the through hole of the pivotal support boss entails a problem of possible wear or seizure on the surface of the pivotal support boss contacting the shoulder bolt, i.e., the inner circumferential surface of the pivotal support boss, due to friction.

As a solution to such a problem, a slide bearing member made of a low-friction resin could be provided inside the through hole of the pivotal support boss, for example.

This, however, will lead to an increase in the number of process steps of the production of the tensioner lever, as it is necessary first to fabricate the slide bearing member, and then to assemble it to the pivotal support boss of the lever body.

The present invention solves these problems, its object being to provide a tensioner lever that inhibits friction-induced wear or seizure on a surface of a pivotal support boss contacting a shoulder bolt so that high durability is achieved, and that is easily producible and enables cost reduction.

To solve the problems described above, the present invention provides a tensioner lever including: a synthetic resin shoe having a traveling surface on which a drive chain slides during travel along a guide length direction; a lever body that supports a back side of the shoe along the guide length direction; and a pivotal support boss provided at a proximal end in the guide length direction of the lever body to allow a distal end thereof to swing, the shoe and the lever body being integrally formed and assembled together by double injection molding, the lever body including a slide bearing member that covers an inner circumferential surface of the pivotal support boss, and a connecting part that connects the slide bearing member and the shoe, the slide bearing member and the connecting part being made of a synthetic resin that forms the shoe, the slide bearing member, the shoe, and the connecting part being configured as a continuous one-piece component.

The tensioner lever of the present invention includes a slide bearing member made of a synthetic resin that covers the inner circumferential surface of the pivotal support boss, so that, with the slide bearing member interposed between the shoulder bolt that functions as the pivot axis and the high-rigidity pivotal support boss, contact between the pivotal support boss and the shoulder bolt is avoided, and wear or seizure caused by friction between the pivotal support boss and the shoulder bolt is inhibited. Namely, friction loss in the pivot part made up of the pivotal support boss and slide bearing member can be reduced, as a result of which high durability is achieved. Moreover, the slide bearing member is made of the same synthetic resin as the shoe, and the slide bearing member and the shoe are configured as a continuous one-piece component connected together by the connecting part. These are integrally formed by double injection molding in the production process of the tensioner lever, so that it is not necessary to mold a slide bearing member separately from the lever body and then to assemble it to the lever body. Since the slide bearing member is formed and assembled at the same time as the molding of the shoe, a level of productivity equivalent to that of an existing tensioner lever for which the shoe and lever body are integrally formed by double injection molding can be achieved, and thus production cost can be reduced.

According to the configuration set forth in claim 2 of the present invention, the connecting part is provided such as to be exposed at least on one side face of the lever body. This feature ensures that the synthetic resin material reliably flows in during the double injection molding to form the connecting part and slide bearing member to achieve high productivity, and allows easy formation of an oil guide groove in the connecting part if such groove is to be provided.

According to the configuration set forth in claim 3 of the present invention, the continuous one-piece component including the slide bearing member, the shoe, and the connecting part includes an oil guide groove that extends from the traveling surface of the shoe to the slide bearing member that covers the inner circumferential surface of the pivotal support boss. This feature allows engine oil to be reliably supplied to the inner circumferential surface of the slide bearing member inside the pivotal support boss from the traveling surface of the shoe. As the engine oil serving as lubricant can be uniformly introduced and permeated between the slide bearing member and the shoulder bolt, localized wear, friction loss, or seizure resulting from contact between the slide bearing member and the shoulder bolt can be further retarded, so that higher durability can be achieved. If the oil guide groove is made of polyamide resin containing polytetrafluoroethylene, the low-friction properties of the resin ensure smooth supply of engine oil to the slide bearing member. The engine oil provides a cooling effect to suppress heat generation in the pivot part, so that the possibility of seizure can be reduced even more.

According to the configuration set forth in claim 4 of the present invention, the oil guide groove includes an oil collecting part provided on the traveling surface of the shoe. This feature ensures that engine oil present on the traveling surface of the shoe to be collected so that the engine oil can be readily supplied to the inner circumferential surface of the slide bearing member via the oil guide groove.

According to the configuration set forth in claim 5 of the present invention, a flange part on one side of the pivotal support boss includes a cut-away portion that accelerates oil introduction radially from outside to inside of the slide bearing member. This feature allows the engine oil supplied by the oil guide groove to be readily delivered to the inner circumferential surface of the slide bearing member.

According to the configuration set forth in claim 6 of the present invention, the lever body is made of a polyamide resin containing glass fiber reinforcement, while the shoe, the slide bearing member, and the connecting part are made of a polyamide resin containing polytetrafluoroethylene. This ensures that, while the lever body has high rigidity, the inner circumferential surface of the pivotal support boss can be imparted with good low-friction properties, so that friction loss in the pivot part can be reduced. Even when there is no oil film on the inner circumferential surface of the slide bearing member, the low-friction properties of the material itself of the slide bearing member, which is made of polyamide resin containing polytetrafluoroethylene, can ensure rotatability of the tensioner lever while reducing the friction loss in the pivot part.

DESCRIPTION OF THE PREFERRED EMBODIMENTS

A tensioner lever according to the present invention may have any specific configuration as long as it includes: a synthetic resin shoe having a traveling surface on which a drive chain slides during travel along a guide length direction; a lever body that supports a back side of the shoe along the guide length direction; and a pivotal support boss provided at a proximal end in the guide length direction of the lever body to allow a distal end thereof to swing, the shoe and the lever body being integrally formed and assembled together by double injection molding, the lever body including a slide bearing member that covers an inner circumferential surface of the pivotal support boss, and a connecting part that connects the slide bearing member and the shoe, the slide bearing member and the connecting part being made of a synthetic resin that forms the shoe, the slide bearing member, the shoe, and the connecting part being configured as a continuous one-piece component, and as long as friction-induced wear or seizure on a surface of the pivotal support boss contacting a shoulder bolt is inhibited so that high durability is achieved, while production is made easy and production cost is reduced.

Embodiment 1

Figure 1:
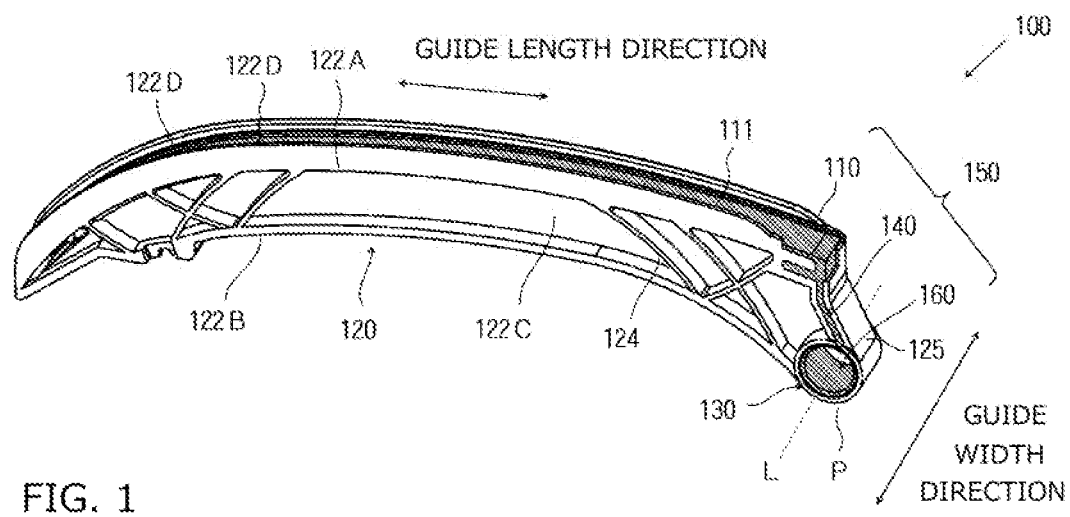
FIG. 1 is a perspective view of a tensioner lever according to a first embodiment of the present invention.
Figure 2:
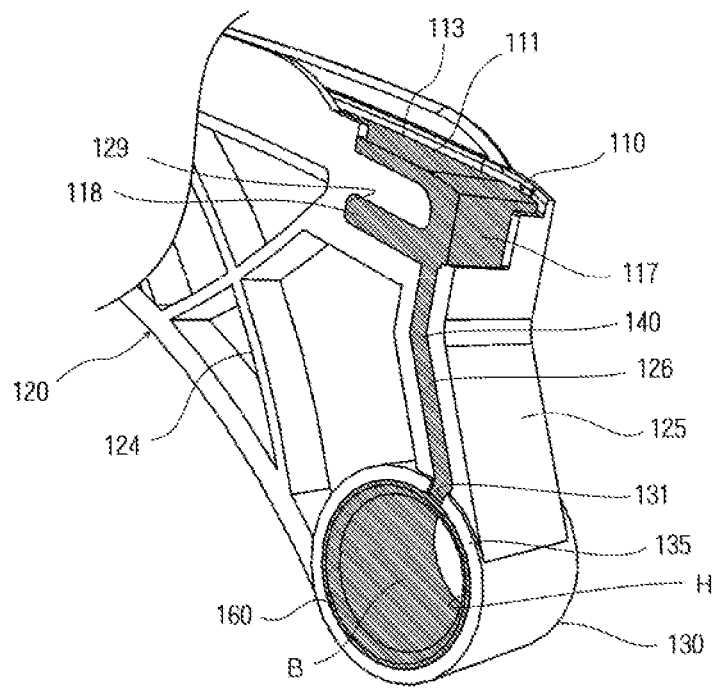
FIG. 2 is a partial enlarged perspective view of the tensioner lever of FIG. 1.
Figure 3:
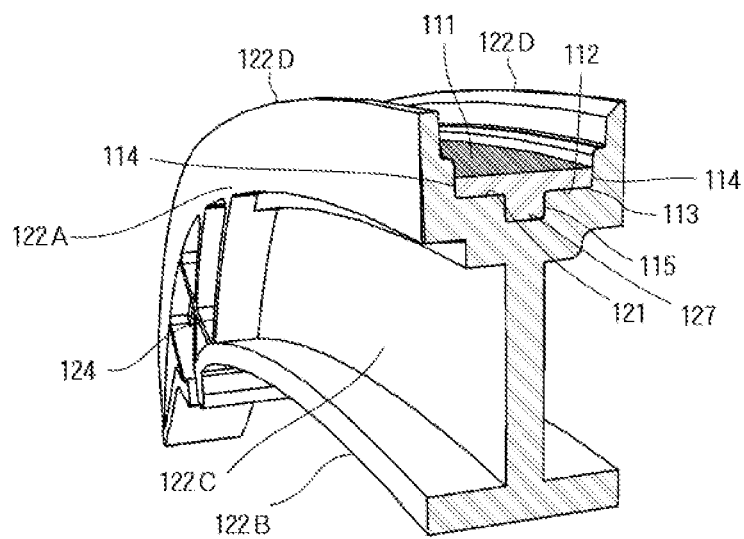
FIG. 3 is a cross-sectional view of the tensioner lever of FIG. 1.

A tensioner lever 100 according to a first embodiment of the present invention will be described with reference to FIG. 1 to FIG. 3.

The tensioner lever 100 is a movable tensioner lever that guides a traveling drive chain while applying tension to the drive chain in corporation with a tensioner. The tensioner lever includes a synthetic resin shoe 110 having a traveling surface 111 on which the drive chain slides during travel along a guide length direction, a lever body 120 that supports the back side 112 of the shoe 110 along the guide length direction, and a pivotal support boss 130 provided at a proximal end in the guide length direction of the lever body 120 to allow the distal end thereof to swing. The shoe 110 and the lever body 120 are integrally formed and assembled together by double injection molding.

The guide length direction herein refers to a direction of the tensioner lever 100 along which the drive chain travels. The guide width direction refers to a direction perpendicular to the guide length direction and parallel to a pivot axis L. The guide height direction refers to a direction perpendicular to the guide length direction and the guide width direction. The left side face of the shoe 110 or lever body 120 refers to a side face on the left side in the guide width direction as viewed from the drive chain traveling from an entrance end toward an exit end, and it is a side face closer to the viewer in FIG. 1.

The lever body 120 is an elongated member extending along the guide length direction, and includes a shoe-side flange 122A having a support surface 121 on which the shoe 110 is supported in tight contact therewith, a tensioner-side flange 122B that faces the tensioner, a web 122C that connects both flanges 122A and 122B, a pair of side walls 122D, 122D standing upright from the shoe-side flange 122A in the guide height direction for holding and restricting the drive chain, and a plurality of reinforcing ribs 124 arranged on both sides in the guide width direction of the web 122C and connecting both flanges 122A and 122B and the web 122C. Both ends in the guide length direction of both flanges 122A and 122B, web 122C, and pair of side walls 122D, 122D constitute an entrance end and an exit end of the tensioner lever 100 for the drive chain, respectively.

A pivotal support boss 130 that forms a pivot part P, or a supported portion that is supported by a shoulder bolt, is provided to the tensioner-side flange 122B at the proximal end of the lever body 120. The pivotal support boss 130 has a through hole H that forms a columnar cavity extending coaxially with the pivot axis L, this columnar cavity or through hole H forming a slide bearing member setting space where a slide bearing member 160 is set. The lever body 120 has a flange part 135 on one side of the pivotal support boss 130. A portion of this flange part 135 is cut away, from an outer circumferential side toward the pivot axis on the inner circumferential side, to form a cut-away portion 131 for accelerating radially inward oil introduction for the slide bearing member 160.

A groove-like joint slit part 127 is formed in the center in the guide width direction of the support surface 121 of the shoe-side flange 122A of the lever body 120 such as to extend along the guide length direction. At the distal end of the lever body 120, in the center in the guide width direction of the support surface 121 of the shoe-side flange 122A, an engaging hole (not shown) is provided continuously with the joint slit part 127 and in the form of a square slot deeper than the groove that forms the joint slit part 127 and elongated along the guide length direction, for restricting the back and forth movements of the shoe 110 in the guide length direction as required. At the proximal end of the lever body 120, near the entrance end for the drive chain on the underside in the guide height direction of the shoe-side flange 122A, there is formed a caved-in part 129 where the flange is caved inward in the guide length direction to form a planar space.

The lever body 120 has a proximal end wall 125 connecting the shoe-side flange 122A and the pivotal support boss 130 at the proximal end thereof. On the left side face of this proximal end wall 125 is formed a groove-like linking groove part 126 extending from near the proximal end of the caved-in part 129 to the pivotal support boss 130 and connects to the cut-away portion 131 of the pivotal support boss 130.

The shoe 110 is a substantially plate-like member that is long along the guide length direction and substantially uniform in thickness. The shoe 110 includes a shoe body 113 having the traveling surface 111 on which the drive chain slides during travel, back side 112, and a pair of shoe side faces 114, 114. On the back side 112 of the shoe body 113, a shoe rib 115 is protruded such as to extend along the guide length direction, in the shape conforming to the joint slit part 127 provided to the support surface 121 of the shoe-side flange 122A of the lever body 120. At the distal end in the guide length direction of the shoe body 113, in the center in the guide width direction of the back side 112, a shoe engaging protrusion (not shown) is provided such as to protrude downward in the guide height direction from the shoe rib 115, coinciding, in the guide direction, with the engaging hole provided to the support surface 121 of the shoe-side flange 122A of the lever body 120, and smaller in the guide length direction than the engaging hole. At the proximal end in the guide length direction of the shoe body 113 near the entrance end for the drive chain are provided a pillar part 117 exposed on the proximal end face (entrance end face) of the lever body 120 and extending downward in the guide height direction continuously with the shoe body 113, and a shoe restricting protruded part 118 continuous with this pillar part 117 and protruding inward in the guide length direction substantially parallel to the traveling surface 111 of the shoe body 113, for restricting displacement of the shoe 110 toward the front side in the guide length direction. The shoe restricting protruded part 118 has a shape conforming to the caved-in part 129 provided to the shoe-side flange 122A of the lever body 120.

The shoe rib 115, shoe engaging protrusion, and shoe restricting protruded part 118 are all integrally formed with the shoe 110, and they are received parts engaging with and received by the joint slit part 127, engaging hole, and caved-in part 129 of the lever body 120, respectively.

The lever body 120 includes the slide bearing member 160 that covers the inner circumferential surface of the pivotal support boss 130. More specifically, the slide bearing member 160 is substantially cylindrical and has an outer shape conforming to the inner contour of the columnar cavity for setting the slide bearing member in the pivotal support boss 130, the inside thereof forming a bolt passing region B, and is arranged to extend along the guide width direction coaxially with the pivot axis L. The lever body 120 further includes a column-like connecting part 140 that extends from the lower end of the pillar part 117 of the shoe 110 to the cut-away portion 131 of the slide bearing member 160. The connecting part 140 is provided such as to be exposed on the left side face of the lever body 120. The slide bearing member 160 and the shoe 110 are thus formed as a one-piece component connected by the connecting part 140. This one-piece component is entirely composed of a synthetic resin having the same low friction properties (self-lubricating properties). Hereinafter, the one-piece component including the slide bearing member 160 and the shoe 110 joined together by the connecting part 140 will be referred to as "low-friction member 150". In FIG. 1 to FIG. 3, this low-friction member 150 is indicated with thick hatches.

The low-friction member 150 is coupled to the lever body 120 that is made of a high-rigidity material in tight contact therewith.

More specifically, the back side 112 and pair of shoe side faces 114, 114 of the shoe 110 respectively face and make tight contact with the support surface 121 and pair of side walls 122D, 122D of the lever body 120. The shoe rib 115, shoe engaging protrusion, and shoe restricting protruded part 118 of the shoe 110 respectively engage with and are accommodated in the joint slit part 127, engaging hole, and caved-in part 129 of the lever body 120 in tight contact therewith. The pillar part 117 of the shoe 110 makes tight contact with the entrance end face of the proximal end wall 125 of the lever body 120. The shoe 110 is thus integrated with the lever body 120. The area of tight contact between the lever body 120 and the shoe 110 is increased by this configuration, so that the bonding strength between the lever body 120 and the shoe 110 is enhanced.

The slide bearing member 160 is arranged inside the space for setting the slide bearing member of the pivotal support boss 130 of the lever body 120 such that the inner circumferential surface of the through hole H of the pivotal support boss 130 and the outer circumferential surface of the slide bearing member 160 make tight contact with each other, and the connecting part 140 is received in the linking groove part 126 of the lever body 120 in tight contact therewith, so that the slide bearing member 150 and connecting part 140 are respectively integrated with the pivotal support boss 130 and the proximal end wall 125.

The tensioner lever 100 has a pivot part P configured by the pivotal support boss 130 and the slide bearing member 160. The tensioner lever 100 is screwed to an inner wall of the engine room with a shoulder bolt passed through the bolt passing region B of the slide bearing member 160 in the pivot part P, and pivotably supported by the shoulder bolt serving as the pivot axis.

The synthetic resin that forms the lever body 120 of the tensioner lever 100 has higher strength than the synthetic resin that forms the shoe 110. Examples include synthetic resins having excellent strength and wear resistance, such as fiber-reinforced synthetic resin, including, for example, reinforced polyamide resin containing glass fiber. More specific examples include polyamide resin such as nylon resin, or polybutylene terephthalate resin, containing glass fiber reinforcement.

Low-friction synthetic resin that forms the low-friction member 150 (shoe 110, slide bearing member 160, and connecting part 140) has good wear resistance and low-friction properties (self-lubricating properties), such as polyamide resin containing polytetrafluoroethylene. Specific examples of polyamide resin include polyamide 6 resin, polyamide 66 resin, and polyamide 46 resin.

The low-friction member 150 and the high-rigidity material lever body 120 are integrated in tight contact with each other by double injection molding and do not need assembling work, in the double injection molding, the lever body 120 is formed from a synthetic resin for the lever by a first cycle of injection molding using a first mold, after which the shoe 110, slide bearing member 160, and connecting part 140 are simultaneously formed from a synthetic resin for the low-friction member by a second cycle of injection molding using a second mold in which the lever body 120 is mounted.

The double injection molding allows formation of the shoe 110 and slide bearing member 160 without any clearances, as the lever body 120 and the pivotal support boss 130 can be joined tightly to the shoe 110 and the slide bearing member 160 respectively, so that problems such as the shoe 110 or slide bearing member 160 coming off of the lever body 120 can be prevented.

Since the lever body 120 and the low-friction member 150 are both made of synthetic resin, the tensioner lever 100 is made more lightweight, while at the same time, the double injection molding enables tight integration of the low-friction member 150 that is made up of the shoe 110, slide bearing member 160, and connecting part 140 with the lever body 120 made of a high-rigidity material. Thus, the tensioner lever 100 can be produced with high productivity, while achieving low-friction properties of the shoe 110 and the pivot part P.

Embodiment 2

Figure 4:
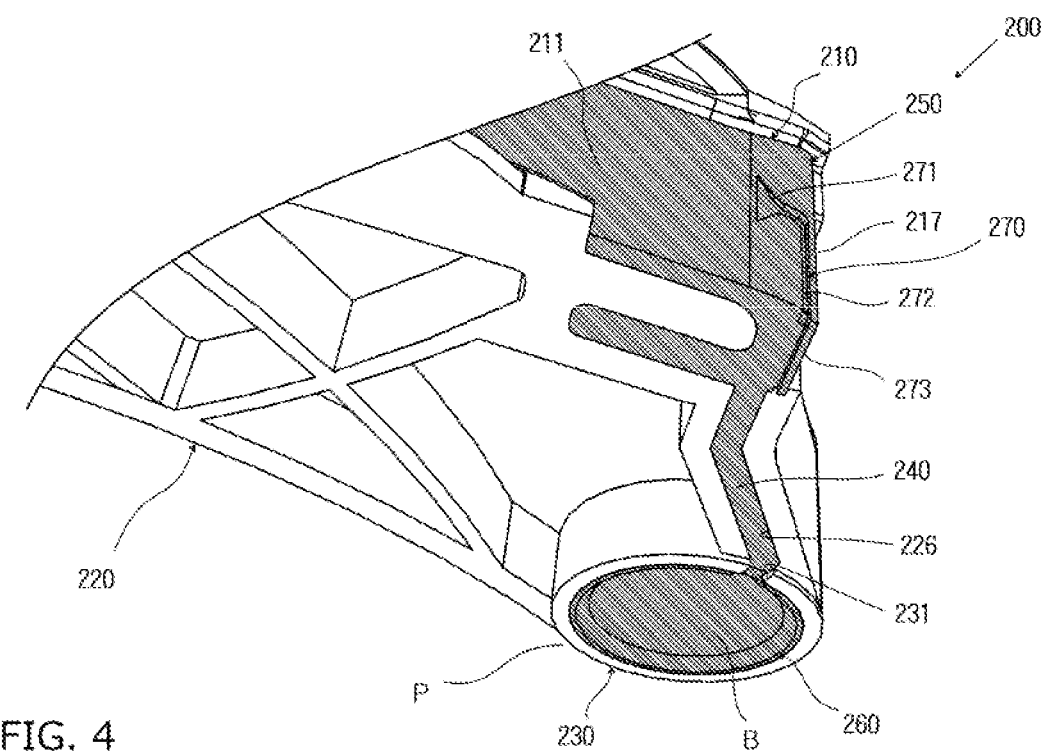
FIG. 4 is a partial enlarged perspective view of a tensioner lever according to a second embodiment of the present invention.

A tensioner lever 200 according to a second embodiment of the present invention has the same structure as that of the tensioner lever 100 according to the first embodiment except that, as shown in FIG. 4, an oil guide groove 270 is provided such as to extend from the traveling surface of the shoe 210 to the slide bearing member 260 that covers the inner circumferential surface of the pivotal support boss 230, as compared to the tensioner lever 100 according to the first embodiment. In FIG. 4, basically, the same reference numerals as those of the tensioner lever 100 according to the first embodiment, are given in the 200s to the components identical or corresponding to those of the tensioner lever 100 according to the first embodiment.

Figure 5:
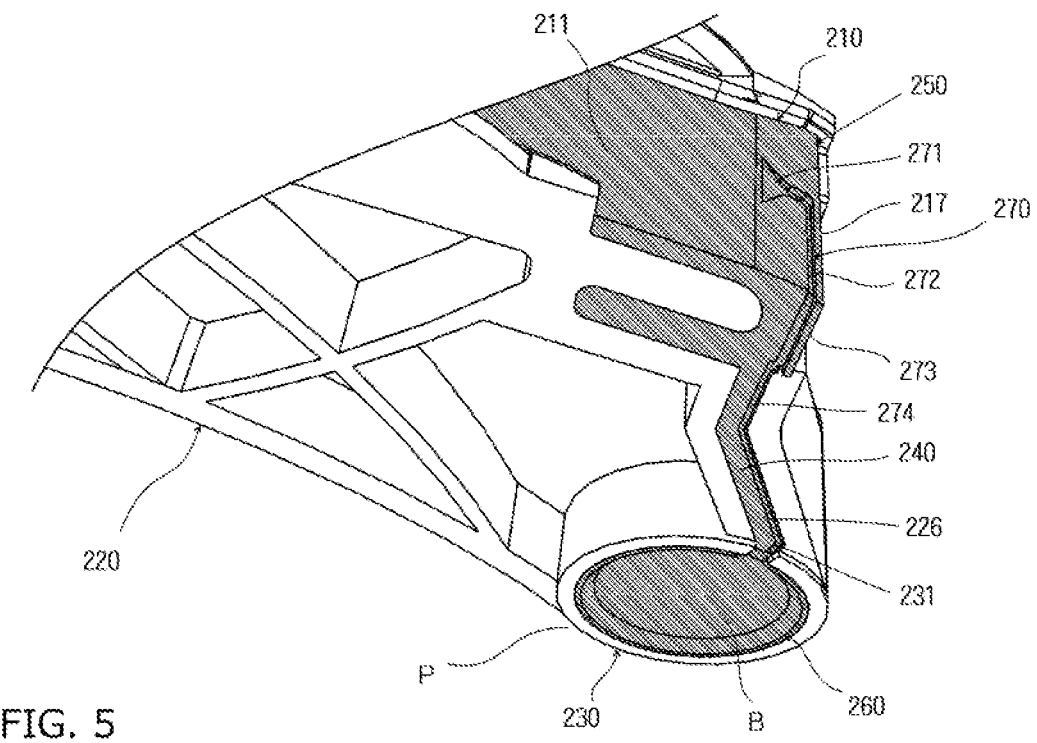
FIG. 5 is a partial enlarged perspective view of a variation example of the tensioner lever according to the second embodiment of the present invention.
Figure 6:
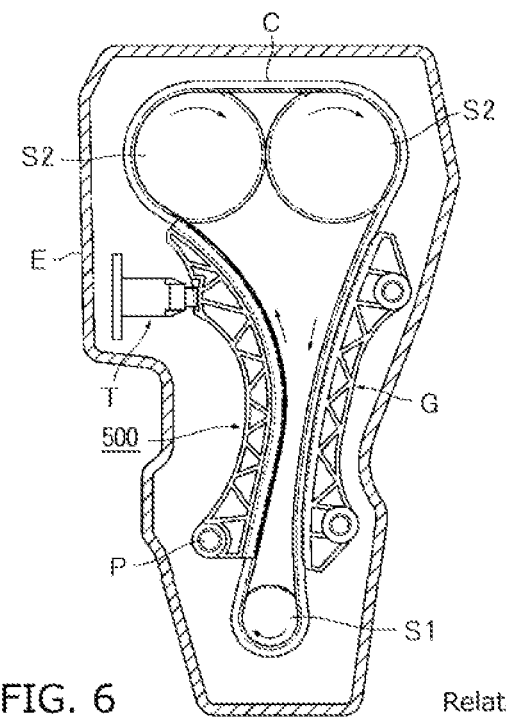
FIG. 6 is an illustrative diagram of a conventional timing system of an engine.
Figure 7:
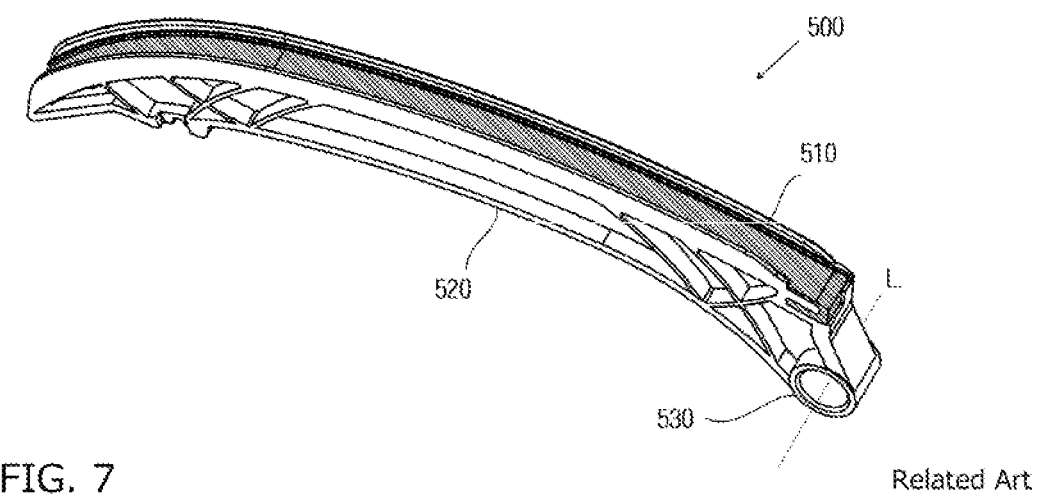
FIG. 7 is a perspective view of a conventional tensioner lever.

More specifically, the oil guide groove 270 includes an oil collecting part 271 that is a funnel-shaped recess provided on the traveling surface 211 at the proximal end of the shoe 210 and tapered outward in the guide length direction, a channel-like trough portion 272 continuous with the tapered end of the oil collecting part 271, extending leftward in the guide width direction from this tapered end to one side face of the shoe 210, specifically to the side face on the left side in the guide width direction (side face closer to the viewer in FIG. 4) and opening to this left side face, and a plate-like oil guide wall 273 protruding from the pillar part 217 of the shoe 210 toward the left side face as well as downward in the guide height direction. Optionally, as shown in FIG. 5, a groove-like oil passage 274 may be formed in the left side face of the connecting part 240 such as to extend from a lower end of the oil guide wall 273 to the cut-away portion 231 of the pivotal support boss 230. Alternatively, the connecting part 240 may be formed with a thickness in the guide width direction smaller than the depth of the linking groove part 226 of the lever body 220, in which case, with the connecting part 240 received in the linking groove part 226, an outer edge portion of the linking groove part 226 on the left side face (outer edge portion closer to the viewer in FIG. 4) functions as an oil guide wall.

The oil guide groove 270 directs the engine oil present on the traveling surface 211 of the shoe 210 via the oil collecting part 271 and trough portion 272 to the side face on the left side in the guide width direction of the shoe 210. The oil then travels on the surface of the connecting part 240 along the oil guide wall 273 and reaches the bolt passing region B of the slide bearing member 260 from the cut-away portion 231 of the pivotal support boss 230. Since the oil guide groove 270 is entirely formed on the low-friction member 250 and the low-friction member 250 is made of a synthetic resin with good low-friction properties (self-lubricating properties), the engine oil collected together on the traveling surface 211 of the shoe 210 can be smoothly and efficiently introduced and permeated into the bolt passing region B in an unobstructed manner.

While specific examples of the tensioner lever according to the present invention have been described in the embodiments above, the tensioner lever according to the present invention is not limited to these examples, and the shapes, positions, sizes, and positional relationships with each other of various constituent parts may be changed in various manners.

For example, while the tensioner lever of the present invention is applied to a timing system wherein an endless drive chain such as a roller chain passed over respective sprockets of a crank shaft and cam shafts inside an engine room is slidably guided by a shoe, the present invention is not limited to this application and may be used for any transmission mechanisms that use chains, belts, ropes and the like, and can be applied in a variety of industrial fields.

What is claimed is:

1. A tensioner lever comprising: a synthetic resin shoe having a traveling surface on which a drive chain slides during travel along a guide length direction; a lever body that supports a back side of the shoe along the guide length direction; and a pivotal support boss provided at a proximal end in the guide length direction of the lever body to allow a distal end thereof to swing, the shoe and the lever body being integrally formed and assembled together by double injection molding, the lever body including a slide bearing member that covers an inner circumferential surface of the pivotal support boss, and a connecting part that connects the slide bearing member and the shoe, the slide bearing member and the connecting part being made of a synthetic resin that forms the shoe, the slide bearing member, the shoe, and the connecting part being configured as a continuous one-piece component.

2. The tensioner lever according to claim 1, wherein the connecting part is provided such as to be exposed at least on one side face of the lever body.

3. The tensioner lever according to claim 1, wherein the lever body includes an oil guide groove that extends from the traveling surface of the shoe to the slide bearing member.

4. The tensioner lever according to claim 3, wherein the oil guide groove includes an oil collecting part provided on the traveling surface of the shoe.

5. The tensioner lever according to claim 1, wherein the lever body includes a flange part on one side of the pivotal support boss, the flange part having a cut-away portion that accelerates radially inward oil introduction to the slide bearing member.

6. The tensioner lever according to claim 1, wherein the lever body is made of a polyamide resin containing glass fiber reinforcement, while the shoe, the slide bearing member, and the connecting part, are made of a polyamide resin containing polytetrafluoroethylene.

* * * * *